United States Patent [19]

Anagnostou

[11] Patent Number: 5,135,994
[45] Date of Patent: Aug. 4, 1992

[54] RARE EARTH CONTAINING CATALYST FOR EPOXY RESIN SYSTEMS

[75] Inventor: Taki J. Anagnostou, Livonia, Mich.

[73] Assignee: Rhone-Poulenc Inc., Princeton, N.J.

[21] Appl. No.: 568,542

[22] Filed: Aug. 15, 1990

Related U.S. Application Data

[63] Continuation of Ser. No. 404,708, Sep. 8, 1989, abandoned.

[51] Int. Cl.$^5$ .............................................. C08G 59/40
[52] U.S. Cl. ..................................... 525/507; 528/92; 528/103; 528/361; 528/365; 252/182.23; 252/182.24
[58] Field of Search ................. 528/92, 103, 361, 365; 525/507; 252/182.23, 182.24

[56] References Cited

U.S. PATENT DOCUMENTS

| | | | |
|---|---|---|---|
| 3,018,262 | 1/1962 | Schroeder | 260/29.2 |
| 3,144,418 | 8/1964 | Hill et al. | 260/2 |
| 3,450,647 | 6/1969 | Gunther et al. | 260/2 |
| 3,487,027 | 12/1970 | Case | 252/431 |
| 4,192,786 | 3/1980 | Shibayama et al. | 528/92 |
| 4,604,452 | 8/1986 | Shimp | 528/92 X |
| 4,608,434 | 8/1986 | Shimp | 528/92 X |

OTHER PUBLICATIONS

Rare Earth compounds as crosslinking catalysts for epoxy resin: CA 107:155570n; Chinese 85,102,264 dated Sep. 24, 1986 (2 abstracts).
Lee and Neville, *Handbook of Epoxy Resins*, McGraw-Hill, N.Y. 1967, pp. 13-17 to 13-10. TP1180.E6 L4.

*Primary Examiner*—John C. Bleutge
*Assistant Examiner*—Frederick Krass

[57] ABSTRACT

The cure of an epoxy resin containing a hardener such as a polycarboxylic acid anhydride can be catalyzed with a catalyst comprising a rare earth carboxylate dissolved in a solvent which is at least dispersible in and reactive with the epoxy resin.

22 Claims, No Drawings

RARE EARTH CONTAINING CATALYST FOR EPOXY RESIN SYSTEMS

This is a continuation of copending application Ser. No. 07/404,708 filed on Sep. 8, 1989 now abandoned.

The invention relates to a rare earth catalyst system for crosslinked epoxy resins, and to epoxy resins cured therewith.

BACKGROUND OF PRESENT INVENTION

The epoxy resins constitute a well known class of resin materials containing the 1, 2 - epoxide group:

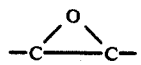

The epoxy resins are not self-hardening, thus requiring the presence of chemical hardening agents to convert them to thermosetting resins. A well known class of hardening agents for epoxy resins is polycarboxylic acid anhydrides. While these anhydrides are effective for curing most solid epoxy resins, they are ineffectual (requiring higher curing temperatures) for most liquid epoxy resins. Consequently, catalysts are used to help promote the cure of epoxy-anhydride systems. A common class of catalysts which have been used for curing liquid epoxy-anhydride resins are tertiary amines such as those described in U.S. Pat. No. 3,052,650. Stannous salts, such as stannous octoate, have also been used for this purpose, e.g., U.S. Pat. No. 3,201,360. Various zinc salts have also been proposed such as in U.S. Pat. No. 3,364,159.

For certain uses, it may be desirable to form a one part catalyzed heat curable resin system which can maintain its viscosity at room temperature for an extended period of time and which then can subsequently be heat cured with effective hardening. As disclosed in U.S. Pat. No. 3,692,715, an epoxy resin selected from the group of polyglycidyl ethers of polyhydric phenols and polyglycidyl esters of aromatic and cycloaliphatic polycarboxylic acids can be admixed with a dicarboxylic acid anhydride in an amount sufficient to provide a specified ratio of anhydride groups per oxirane group. This resin system is catalyzed with an aliphatic carboxylic acid salt of a polyvalent metal selected from the group consisting of a titanium, zirconium, hafnium, cerium and thorium. It is noted that, in Example VIII, a diglycidyl ether of bisphenol A is admixed with tetrapropenylsuccinic anhydride and is cured with a solution of cerium neodecanoate in mineral spirits. This experiment can be genericized as using a cerium carboxylate in non-reactive organic solvent as the curing catalyst for an epoxy-anhydride resin system.

Attempts to prepare a composition similar to that disclosed in U.S. Pat. No. 3,692,715 were not successful. Applicant noticed that the cerium neodecanoate in mineral spirits was not freely and easily dissolvable in epoxy resin. Applicant used a commercial epoxy resin which is a diglycidyl ether of bisphenol A having an average epoxy equivalent of 185-192 and a greater viscosity than the material used in Example 1 of U.S. Pat. No. 3,692,715. The improperly and incompletely dispersed rare earth catalyst composition provided uneven thermal curing of the epoxy resin.

It has now been found that rare-earth carboxylates dissolved in a reactive solvent can be used as catalyst to overcome these problems.

SUMMARY OF THE PRESENT INVENTION

It has now been found that cross linkable epoxy resins, particularly those using a carboxylic acid anhydride hardening system, can be effectively cured (using heat or ultraviolet light or electron beam) by means of a catalyst system comprising a rare earth carboxylate dissolved in a solvent which is at least dispersible in and reactive with the epoxy resin. Curing is accomplished by using a source of energy sufficient for effecting that end such as heat.

It has unexpectedly been found that a rare-earth carboxylate when dissolved in the reactive solvent enhances the catalytic curing effect in comparison to known catalyst systems such as stannous octoate. Applicant has found that effective cures using the present invention can be obtained at temperatures low enough that the reaction occurs much more slowly when using a stannous octoate system.

DETAILED DESCRIPTION OF THE INVENTION

The epoxy resins cured by the present invention are those heat curable systems requiring a hardener or cross-linking agent to effect a cure. These are well known to one of ordinary skill. Exemplary of these resins are the polyglycidyl ethers of polyhydric phenols and the polyglycidyl esters of aromatic, aliphatic and cycloaliphatic polycarboxylic acids and amines. Commercially, resins of this type include resins produced from epichlorohydrin and bisphenol A or bisphenol F, brominated resins, cycloaliphatic resins, Novolac resins, phenoxy resins and aliphatic resins. The epoxy resins used in the invention can be solid but are preferably liquid with a viscosity of less than 30,000 cps at 24° C. The epoxy resin should contain at least about 1.5 and preferably about 2.0 oxirane groups per average molecular weight. While one may use less than 1.5 oxirane groups per average molecular weight, the slower reactivity would increase the cure time and affect the toughness of the cured resin. It is also possible to use more than 2.0 oxirane groups per average molecular weight provided that the viscosity of the resin composition does not increase to an unusable point, such as above 5000 cps.

The epoxy resins require a hardener cross-linking agent in order to convert them to thermosetting resins. Effective hardeners include aliphatic polyamines, polyamides, amido-amines, aromatic amines, cycloaliphatic amines, formaldehyde coreactants, polycarboxylic polyesters, polysulfides and polymercaptans, and, preferably, anhydrides of polycarboxylic acids. The amounts and usage levels of any hardener is well known to one of ordinary skill. This discussion will be continued in relation to anhydrides.

The acid anhydrides usable as cross-linking agents include straight chain, branch chain or cyclic acid anhydrides of polycarboxylic acids. Illustrative acid anhydrides include trimellitic anhydride, benzophenone dianhydride, (methyl) tetrahydrophthalic anhydride and dodecenyl succinic anhydride. Particularly preferred anhydrides include hexahydrophthalic anhydride (HHPA) and Nadic methyl anhydride (NMA) [methyl bicyclo[2.2.1]heptene-2, 3-dicarboxylic anhydride] and, more preferably, HHPA.

The dicarboxylic acid anhydride is used in an amount sufficient to effect the desired thermoset cure of the epoxy resin. The anhydride can be used in an amount sufficient to provide from about 0.5 to about 1.2 anhydride groups per oxirane group. Such an amount of anhydride is sufficient to dissolve in the epoxy resin to produce a mixture which remains liquid at room temperature.

The catalyst of the invention is a rare-earth metal salt of a carboxylic acid dissolved in a solvent reactive with the epoxy resin. The metal has an atomic number of 39 and 57-71. Preferably, the metal has an atomic number of 57-60, i.e., lanthanum, cerium, praseodymium, and neodymium. The catalyst can be prepared by dissolving the rare earth carboxylate in the reactive solvent. The carboxylate is used in an amount sufficient to provide from about 0.1% to about 95% and preferably about 10% rare earth carboxylate in the solvent, the percentage being based on the combined weight of the rare earth carboxylate and the reactive solvent.

The catalyst components can be blended cold or heated to assist dissolution. Heating is not necessary to dissolve the carboxylate. It has been found that a blend of cold mixed catalyst and epoxy resin is projected to have a very long shelf life at room temperature. The catalyst is latent and does not react with the epoxy resin. Surprisingly, however, a blend of catalyst formed with heating and an epoxy resin has a shorter shelf life. It is theorized that some reaction has taken place during the heating of the catalyst forming a species different from the cold blend due to the shortened shelf life.

It is also noted that blends of glycidyl neodecanoate and rare earth carboxylate without the epoxy resin gel at room temperature after a few weeks. Heat will liquify the material which can then be used.

Stannous octoate dissolved in cold glycidyl neodecanoate blended with an epoxy resin - HHPA system evidences a decrease in shelf life stability. This is also observed using NMA as the anhydride.

While the glycidyl ester is the preferred reactive solvent, higher boiling glycidyl ether solvents can also be used.

The carboxylic acid component, preferably aliphatic, has from 3 to 20 carbon atoms. These can be illustrated by the acid salts of butyric acid, caprylic acid, octoic acid, linoleic acid, benzoic acid and the like. Preferably, the catalyst is the rare earth metal salt of octoic acid. The catalyst is used in an amount sufficient to provide at least 0.1 part, and preferably from about 0.5 to about 1.0 parts by weight metal per 100 parts by weight of the epoxy resin admixed with the hardener. The amount of catalyst is sufficient to allow substantial curing of the epoxy resin at 150° C. after 8 hours. At concentrations of metal below 0.05 parts, the curing of the composition is slow. At concentration of metal above 5 parts, the curing rate is not significantly increased and it is uneconomical to utilize larger amounts.

The composition of the present invention is useful as catalysts for and as part of epoxy resin systems which can be used in the many areas such resins are presently used such as for potting and molding compounds, one-package bake or UV-cure coatings, adhesives, electrical encapsulation and coatings.

The present invention will be further illustrated in the examples which follows.

As used in these examples, the epoxy resin is a glycidyl ether prepared from epichlorohydrin and bisphenol A, commercially available under the trademark EPON from Shell. Similar resins are also available from other sources such as D.E.R. resins from Dow, EPOTUF resins from Reichold, ARALDITE resins from Ciba Geigy and EPIREZ resins from Hi-Tek. These resins generally have epoxide equivalent weights ranging from about 170 to 760 and preferably from about 170-470, i.e., liquid.

EXAMPLE 1

A thermosetting self-curing resin composition was prepared by blending 100 parts by weight of a diglycidyl ether of bisphenol A (DGEBA) which has an epoxy equivalent weight of 185-192, 80 parts by weight of a hexahydrophthalic anhydride (HHPA), and 1.0 part by weight of rare earth carboxylate accelerator. The accelerator was in the form of a 10% solution of cerium (IV) octoate in a glycidyl neodecanoate (GD) having a flash point of 116° C., a reactive solvent. The 10% accelerator solution was prepared by heating the cerium (IV) octoate and the glycidyl neodecanoate to 150° C. for 15 minutes.

The epoxy resin composition was added to a test tube with an extended glass rod and was immersed in a preheated, temperature-stabilized oil bath. The cure time at 130° C. and 150° C. was noted. The cure time (±5 minutes) was defined as the time from immersion to when the glass rod immersed in the resin composition could not be moved.

The cure time at 130° C. was 72 minutes and at 150° C. was 26-30 minutes. The cure time for a stannous octoate control using the same resin system without the reactive solvent was 315 minutes at 130° C. and 90-110 minutes at 150° C.

Samples of the resin composition were tested for shelf life stability using an accelerated shelf life test. Samples of the uncured resin of the invention were stored at 49°-50° C. for 72 hours. This corresponds to 3 months storage at room temperature. Results of these experiments are presented in Table I.

TABLE I

| | SHELF LIFE DGEBA/HHPA RESIN | | | |
|---|---|---|---|---|
| | Viscosity | | | |
| | Ce Oct/GD | | Sn Oct | |
| Time (Hours) | Not Heated | *Heated | GD | No GD |
| 0 | 500 | 729 | 729 | 1017 |
| 14.5 | 707 | 1199 | — | — |
| 17.7 | — | — | 1921 | 1662 |
| 36.5 | 1213 | 2207 | — | — |
| 38.3 | — | — | 3163 | 2365 |
| 58.7 | 1717 | 3099 | — | — |
| 60.3 | — | — | 5060 | 3748 |
| 72.0 | 2168 | 3737 | — | — |

*Mixture preheated to 150° C. for 15 minutes, then cooled to room temperature prior to addition to epoxy resin - anhydride system and measurement of shelf life at 49-50° C. for 72 hours. Concentrations of all metals were $1.09 - 1.3 \times 10^{-5}$ mol metal/gram of resin mixture.

EXAMPLES II-VI

To the above DGEBA/HHPA mixture, the following rare earth carboxylates were added as 10% solutions in glycidyl neodecanoate unless otherwise noted. The 10% solutions were prepared as in Example I. The following results were obtained.

TABLE II

| Ex. No. | Compound | CURE TIME - MINUTES | |
|---|---|---|---|
| | | 130° C. | 150° C. |
| II | Ce(III) acetylacetonate | 105 | 38-39 |
| III | Ce(IV) acetylacetonate | 75 | 25-30 |
| IV | La(III) acetylacetonate | 333 | 50 |
| V | Ce(III) neodecanoate* | 60 | 22 |
| VI | La(III) octoate* | 183 | 56 |

*In high boiling mineral spirits.

The final metal concentration of all the rare earth carboxylates in GD and for the stannous octoate in Examples I-VI was $1.09-1.3 \times 10^{-5}$ mol metal/gram of resin mixture.

These results show that rare earth carboxylates effect a cure of HHPA—crosslinked epoxy resin systems up to 3 times faster than the stannous octoate standard.

EXAMPLE VII

The process of Example I was repeated using 80 parts of Nadic methyl anhydride (NMA), also known as Methyl-5-norbornene-2,3-dicarboxylic anhydride.

The Ce (VI) octoate cure times at 130° C. were 98-107 minutes and 40-42 minutes at 150° C. The cure times for the stannous octoate control were 96-110 minutes at 150° C. with no gel attained after 6 hours at 130° C.

In the shelf life stability results are given in Table III.

TABLE III
SHELF LIFE DGEBA/NMA RESIN

| | Viscosity | | | |
|---|---|---|---|---|
| | Ce Oct/GD | | Sn Oct | |
| Time (Hours) | Not Heated | *Heated | GD | No GD |
| 0 | 865 | 1005 | 1095 | 1206 |
| 16 | 1393 | 1685 | — | — |
| 22 | — | — | 3481 | 2318 |
| 38 | 1473 | 2371 | — | — |
| 51 | 1925 | 2329 | — | — |
| 63 | 1840 | 2853 | — | — |
| 72 | 2074 | 3160 | Est. 11,000 | 4312 |

*Mixture preheated to 150° C. for 15 minutes, then cooled to room temperature prior to addition to epoxy resin - anhydride system and measurement of shelf life at 50° C. for 72 hours. Concentrations of all metals were $1.09 - 1.3 \times 10^5$ mol metal/gram of resin mixture.

EXAMPLES VIII-XII

To the DGEBA/NMA resin mixture as described in Example VII, the following rare earth carboxylates were added.

| Ex. No. | Compound | CURE TIME - MINUTES | |
|---|---|---|---|
| | | 130° C. | 150° C. |
| II | Ce(III) acetylacetonate | 176-195 | 60-64 |
| III | Ce(IV) acetylacetonate | 95-105 | 36-47 |
| IV | La(III) acetylacetonate | 147 | 60 |
| V | Ce(III) neodecanoate* | 128 | 50 |
| VI | La(III) octoate* | 180 | 65 |

The final metal concentration of all rare earth carboxylates in the reactive solvent and for the stannous octoate was $1.09-1.3 \times 10^{-5}$ mol metal/gram of resin mixture.

These results show that rare earth carboxylates effect a cure of NMA-crosslinked epoxy resin systems up to 3 times faster than the stannous octoate standard.

The results of the Examples were verified by Differential Scanning Calorimetry (DSC). For a 13 mg sample of the resin of Example I, relative temperatures (4° C./min scan rate) for cerium (IV) octoate/GD versus stannous octoate were 202° C. and 256° C., respectively. The enthalpy of these peak exotherms, defined as the area under the exotherm peak, was −60.8 cal/gram for cerium (IV) octoate/GD and −77 cal/gram for stannous octoate.

For the La(III) octoate in mineral spirits in Example VI, the DSC cure temperature was 207° and the enthalpy was −64.2 cal/gram.

For a 8 mg sample of Example VII, the relative cure temperatures versus stannous octoate were 212° C. versus 239° C., respectively. The enthalpy for these exotherms was −49.6 cal/gram for cerium IV octoate/GD and was not measured for stannous octoate.

In Example XII, for La(III) octoate in mineral spirits, the DSC cure temperature was 211° C. and the enthalpy was −35.5 calories per gram.

What is claimed is:

1. A catalyst for a curable epoxy resin comprising a rare earth carboxylate dissolved in a solvent which is dispersible in and reactive with the epoxy resin, said solvent being glycidyl neodecanoate.

2. The catalyst of claim 1 wherein the rare earth has an atomic number of 39 and 57-71.

3. The catalyst of claim 1 wherein the rare earth has an atomic number of 57-60.

4. The catalyst as recited in claim 1 wherein the carboxylate has 3 to 20 carbon atoms.

5. The catalyst as recited in claim 1 wherein the rare earth carboxylate is cerium octoate.

6. A process for preparing heat curable epoxy resins comprising.
   a. Dissolving a rare-earth carboxylate in a solvvent which is dispersible in and reactive with a curable epoxy resin; and
   b. Combining the soolvent-carboxylate solution with said heat curable epoxy resin, said solvent being glycidyl neodecanoate.

7. The process as recited in claim 6 wherein the rare-earth has an atomic number of 39 and 57-71.

8. The process as recited in claim 6 wherein the rare-earth has an atomic number of 57-60.

9. The process as recited in claim 6 wherein the carboxylate has 3 to 20 carbon atoms.

10. The process as recited in claim 6 wherein the rare earth carboxylate is cerium octoate.

11. The process as recited in claim 6 wherein the epoxy resin further contains a hardener cross-linking agent.

12. The process as recited in claim 6 wherein the epoxy resin further includes a polycarboxylic acid anhydride cross-linking agent.

13. The process as recited in claim 6 wherein the epoxy resin—carboxylate solution of Step b) is heat cured.

14. A heat curable epoxy resin comprising a rare-earth carboxylate dissolved in a solvent reactive with the epoxy resin in combination with a curable epoxy resin, said solvent being glycidyl neodecanoate.

15. The epoxy resin as recited in claim 14 wherein the rare earth has an atomic number of 39 and 57-71.

16. The epoxy resin as recited in claim 14 wherein the rare earth has an atomic number of 57-60.

17. The epoxy resin as recited in claim 14 wherein the carboxylate has 3 to o20 carbons.

18. The epoxy resin as recited in claim 14 wherein the epoxy resin further includes a hardener cross-linking agent.

19. The epoxy resin as recited in claim 14 wherein the epoxy resin further includes a dicarboxylic acid anhydride hardener cross-linking agent.

20. The epoxy resin as recited in claim 19 wherein the anhydride is hexahydrophthalic anhydride.

21. The epoxy resin as recited in claim 20 wherein the rare earth has an atomic number of 57–60 and the carboxylate has 3 to 20 carbon atoms.

22. The epoxy resin as recited in claim 21 wherein the carboxylate is a rare-earth salt of octoic acid.

* * * * *